Patented Dec. 15, 1936

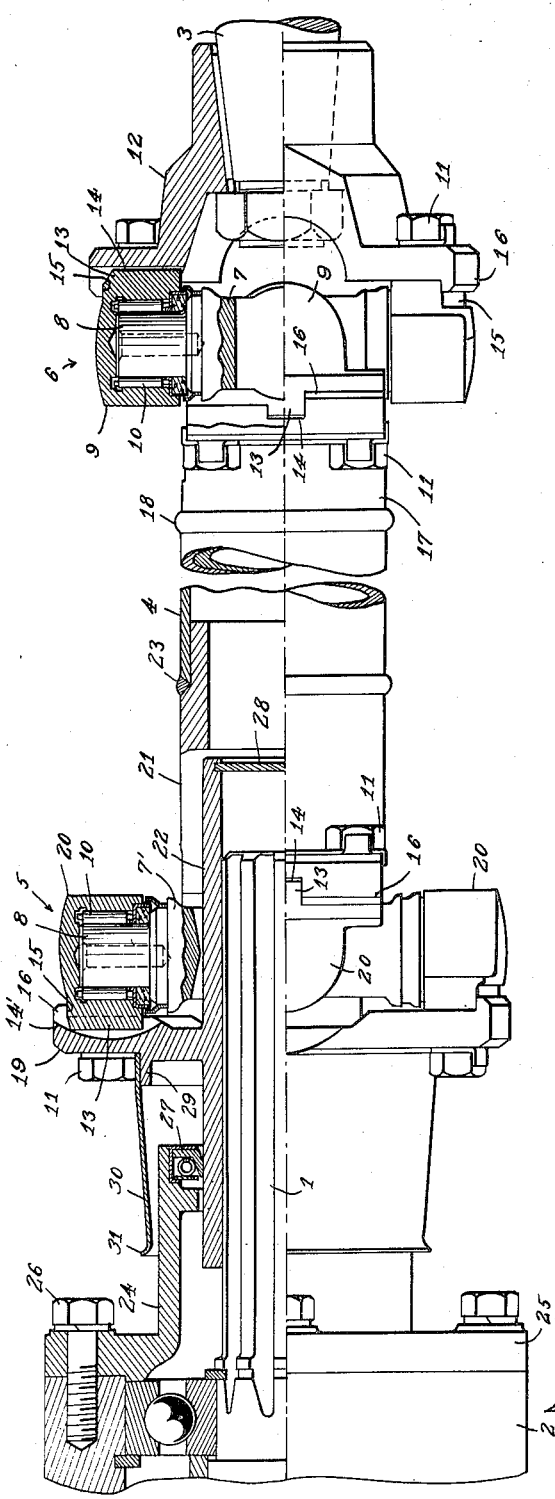

2,064,392

UNITED STATES PATENT OFFICE 2,064,392

UNIVERSAL JOINT ASSEMBLY

Carl E. Swenson and Edmund B. Anderson, Rockford, Ill., assignors, by mesne assignments, to Borg-Warner Corporation, Chicago, Ill., a corporation of Illinois Application July 8, 1933, Serial No. 679,488

9 Claims. (Cl. 64—17)

This invention relates to a universal joint assembly for motor vehicles.

It has been the practice heretofore to connect the transmission shaft with the axle driving shaft or spindle through a universal joint assembly consisting of a front and a rear universal joint and a connecting propeller shaft or tube, the front universal joint being connected rigidly to the transmission shaft and having a telescoping splined connection with the propeller shaft. It is the principal object of our invention to rearrange the front universal joint so that it is rigidly connected to the front end of the propeller shaft and has a telescoping splined connection with the transmission shaft, whereby to have a portion thereof work back and forth in a rearward extension of the transmission housing and secure lubrication of the splined parts from the transmission housing.

Another object of the invention is to simplify and improve the assembly by the elimination of the conventional coupling flanges, one of the universal joints having bearings constructed for detachable connection with a yoke taking the place of the coupling flange otherwise provided as a companion to a flange on the universal joint yoke, and said joint being further constructed so as to provide interfitting torque transmitting connections between the bearings and yoke to which they are bolted, whereby to relieve the bolts of driving strains and shocks and eliminate a common cause of the development of play in the assembly.

Other objects and advantages of our invention will be brought out in the course of the following detailed description, in which reference is made to the accompanying drawing, showing a universal joint assembly embodying my invention, partly in section and partly in side elevation.

The present invention is concerned with improvements in the assembly between the transmission shaft 1 which projects rearwardly from the housing 2, and the axle driving shaft or spindle 3 projecting forwardly from the differential housing, not shown. This assembly, generally speaking, consists of a propeller shaft or tube 4 and front and rear universal joints 5 and 6, respectively, the joint 5 connecting the front end of the propeller shaft with the transmission shaft 1, and the joint 6 connecting the rear end of the propeller shaft with the shaft 3. The joint 6 corresponds fairly closely to that shown in the copending application of Carl E. Swenson, Serial No. 615,496, filed June 6, 1932. It comprises a cross 7 having four trunnions 8, ninety degrees apart, received in cup-shaped bearings 9 containing anti-friction rollers 10. Two diametrically opposed bearings 9 are fastened by bolts 11 to a yoke 12 secured as shown to the shaft 3. Key projections 13 on the bearings 9 fit in radial keyways 14 on the yoke 12 to transmit torque from the bearings to the yoke independently of the bolts, and arcuate shoulders 15 on the ends of the bearings 9 engage complementary arcuate surfaces on the projecting portions 16 of the yoke 12 to transmit end thrust from the bearings to the yoke independently of the bolts, so that the bolts are relieved of any duty save that of holding the bearings firmly seated on the yoke. In like manner the other two diametrically opposed bearings 9 are fastened by bolts 11 to another yoke 17 secured in any suitable manner on the end of the propeller shaft, as by welding at 18. The use of a joint of this construction with its bearings detachable directly from the yokes makes possible the total elimination of coupling flanges that were otherwise found necessary at least between the one joint and shaft, as will be brought out in the discussion of our invention following the description of the rest of the assembly. We shall now describe the front universal joint 5 and its connections with the transmission and propeller shafts 1 and 4, as well as its novel relation to the transmission housing 2.

The universal joint 5, it will soon appear, is generally similar to that disclosed in the Swenson application previously mentioned, the principal difference being in the construction of the yoke 19 on which two of the anti-friction bearings 20 are mounted. The other yoke 21 carrying the other two bearings 20 is the same as either of the yokes 12 and 17, except for slight elongation of the arms thereof to afford clearance for the adjacent end of the elongated sleeve portion 22 of the yoke 19. The yoke 21 may be secured in any suitable manner to the front end of the propeller shaft 4 as by welding at 23. Since the same type of bearings is employed at 20 as at 9, we have correspondingly numbered the rollers 10 in said bearings, the bolts 11, key projections 13, keyways 14, arcuate shoulders 15 and associated portions 16. The keyways 14' in the yoke 19 are milled out on an arc as shown because the sleeve portion 22 will not permit of milling diametrically across the yoke as in the case of the yokes 12, 17, and 21. The cross 7' is slightly different from the cross 7 in joint 6, owing to the fact that it has to straddle the sleeve portion 22 of the yoke 19 and accordingly brings the trunnions 8 farther away from the axis of rotation.

The yoke 19 is provided near the middle of the sleeve portion 22 which is internally splined to fit slidably on the splined shaft 1. The front end of the sleeve portion 22 enters a neck 24 projecting rearwardly from a cover plate 25 bolted as at 26 onto the back of the transmission housing 2. A suitable retainer 27 in the neck 24 has wiping contact on the sleeve 22 to retain lubricant in the housing in the reciprocation of the sleeve on the shaft. The fact that the sleeve works back and forth in the rearward extension of the housing insures lubrication of the splined connection from the housing, thus making it unnecessary to make special provision for lubrication of these relatively moving parts, otherwise required when the front universal joint had a telescoping splined connection with the front end of the propeller shaft. A plug or other closure 28 is provided in the rear end of the sleeve 22 to prevent the escape of lubricant. A cylindrical hub 29 is formed on the yoke 19 concentric with the sleeve 22 and a sheet metal ring or sleeve 30 is pressed or otherwise suitably secured on the hub 29 and projects forwardly therefrom and surrounds the neck 24 with sufficient clearance between the parts so that the sleeve 22 may slide back and forth freely on the shaft but dirt and water will not be allowed to have access to said sleeve and work in past the retainer 27 into the housing. An outwardly projecting rim 31 is formed on the ring 30 to throw foreign matter outwardly under centrifugal action and create a draft of air moving outwardly with respect to the ring at the rim to minimize the danger of dirt or water entering between the ring 30 and the neck 24.

In operation, the shafts 1 and 3 are, of course, in normally fixed spaced relation but move relative to one another in a well known manner. The propeller shaft 4 must, therefore, assume different positions of angularity with respect to the shafts 1 and 3. The sleeve 22 slides back and forth on the shaft 1 to compensate for changes in angularity of the shaft 4. The fact that the sleeve is so long insures easy sliding thereof on the splined shaft and, of course, these parts are always assured of good lubrication from the housing 2 to prevent binding or seizing. The dirt guard 30 prevents entry of dirt or water to that portion of the sleeve working in the housing extension so that there will be no contamination of the lubricant in the housing. Incidentally, if any lubricant works its way past the retainer 27, it will be caught on the inside of the guard 30 instead of being thrown against the bottom of the car, and the guard 30, therefore, serves a double function. In assembling the propeller shaft on the car it is manifest that the novel method of fastening the bearings 9 and 20 on the yokes of the universal joints greatly simplifies matters and makes it possible to do without the coupling flanges that were otherwise necessary. As shown in Swenson Patent #1,651,850, for example, it was necessary to provide coupling flanges at least at the one end of the assembly, one flange being provided on a yoke of one of the joints to be bolted to a companion flange on the shaft to which the joint was to be secured. By the use of joints as herein disclosed where the bearings are detachable directly from the yokes, the car manufacturer provides a yoke such as the yoke 12 instead of a companion flange, and when the universal joint assembly is shipped to the car manufacturer, the two bearings that are to be fastened to the yoke 12 are held in place by a wire up to the time they are bolted onto the yoke, when, of course, the wire may be removed. Thus an extra part is eliminated and there are but four bolts to apply as compared with six or eight where coupling flanges were used and, not only that, but a better connection results, because the key connections at 13—14 are better torque transmitting connections than the bolted coupling flanges, and the present assembly is found to remain free of play, whereas the bolted coupling flanges invariably developed considerable play after some service.

It is believed the foregoing description conveys a good understanding of the objects and advantages of our invention. The appended claims have been drawn with a view to covering all legitimate modifications and adaptations.

We claim:

1. In combination, a housing having a tubular projecting portion, a driving shaft projecting therefrom, a drive transmitting sleeve slidable on the shaft but non-rotatable relative thereto, annular sealing means on said housing closing the space between the sleeve and the tubular portion of the housing, and a universal joint carried on said sleeve and having a dirt shield sleeve projecting therefrom and surrounding the tubular housing portion in closely spaced relation thereto, said sleeve being movable axially relative thereto with said joint and first sleeve.

2. A structure as set forth in claim 1 wherein the dirt shield sleeve is formed to provide an outwardly directed annular rim on the free end thereof substantially as and for the purpose described.

3. In combination, a housing having a tubular projecting portion, a driving shaft projecting therefrom, a drive transmitting sleeve slidable on the shaft but non-rotatable relative thereto, annular sealing means on said housing closing the space between the sleeve and the tubular portion of the housing, an annular wall projecting from said sleeve spaced from the end of the tubular housing portion, a dirt shield sleeve extending from one side of the annular projection and surrounding the tubular housing portion in closely spaced relation thereto, said sleeve being movable axially relative thereto with said first sleeve, and a universal joint of the trunnion type having two opposed bearings thereof detachably mounted on the other side of said annular projection.

4. A structure as set forth in claim 3 wherein the dirt shield sleeve is formed to provide an outwardly directed annular rim on the free end thereof substantially as and for the purpose described.

5. In a power transmission for motor vehicles, a transmission housing, a driving shaft extending from a rearwardly projecting portion of the housing, a trunnion type universal joint including a sleeve slidably but non-rotatably mounted on the projecting portion of said shaft, and an annular flange on said sleeve intermediate the ends thereof constructed to mount bearings for the trunnions of said joint on one side thereof whereby to dispose the joint with its center line inwardly spaced from the end of said shaft, said flange being formed on the other side to provide an annular shoulder of larger diameter than the projecting portion of the housing, and a circular dirt guard carried on said shoulder and disposed in telescoping relation with said projecting housing portion, for the purpose described.

6. In a power transmission for motor vehicles, a transmission housing, a driving shaft extending from a rearwardly projecting portion of the housing, a trunnion type universal joint including a sleeve slidably but non-rotatably mounted on the projecting portion of said shaft, and an annular flange on said sleeve intermediate the ends thereof having radial recesses provided therein on the side toward the trunnions of said joint arranged to receive radial projections provided on bearings fitting on said trunnions, said bearings having means for detachably securing the same to the flange, said flange being formed on the other side to provide an annular shoulder spaced from the projecting portion of the housing, and a circular dirt guard carried on said shoulder and disposed in telescoping relation with said projecting housing portion, for the purpose described.

7. In a power transmission for motor vehicles, a transmission housing, a driving shaft extending from a rearwardly projecting portion of the housing, a trunnion type universal joint including a sleeve slidably but non-rotatably mounted on the projecting portion of said shaft, and a support on said sleeve intermediate the ends thereof constructed to mount bearings for the trunnions of said joint on one side thereof whereby to dispose the joint with its center line inwardly spaced from the end of said shaft, said support having on the other side a dirt guard support spaced from the projecting portion of the housing, and a dirt guard carried on said support and disposed in telescoping relation with said projecting housing portion, for the purpose described.

8. In combination, a housing having a tubular projecting portion, a driving shaft projecting therefrom, a drive transmitting sleeve slidable on the shaft but non-rotatable relative thereto, annular sealing means on said housing closing the space between the sleeve and the tubular portion of the housing, a universal joint carried on said drive transmitting sleeve, and a dirt shield sleeve surrounding the tubular housing portion in closely spaced relation thereto and carried by the drive transmitting sleeve for movement axially therewith.

9. A structure as set forth in claim 8 wherein the dirt shield sleeve is formed to provide an outwardly directed annular rim on the free end thereof substantially as and for the purpose described.

CARL E. SWENSON.
EDMUND B. ANDERSON.